March 31, 1925.
T. G. DERBYSHIRE
1,532,047
LIFTING AND HAULING APPLIANCE
Filed Dec. 20, 1922
2 Sheets-Sheet 1
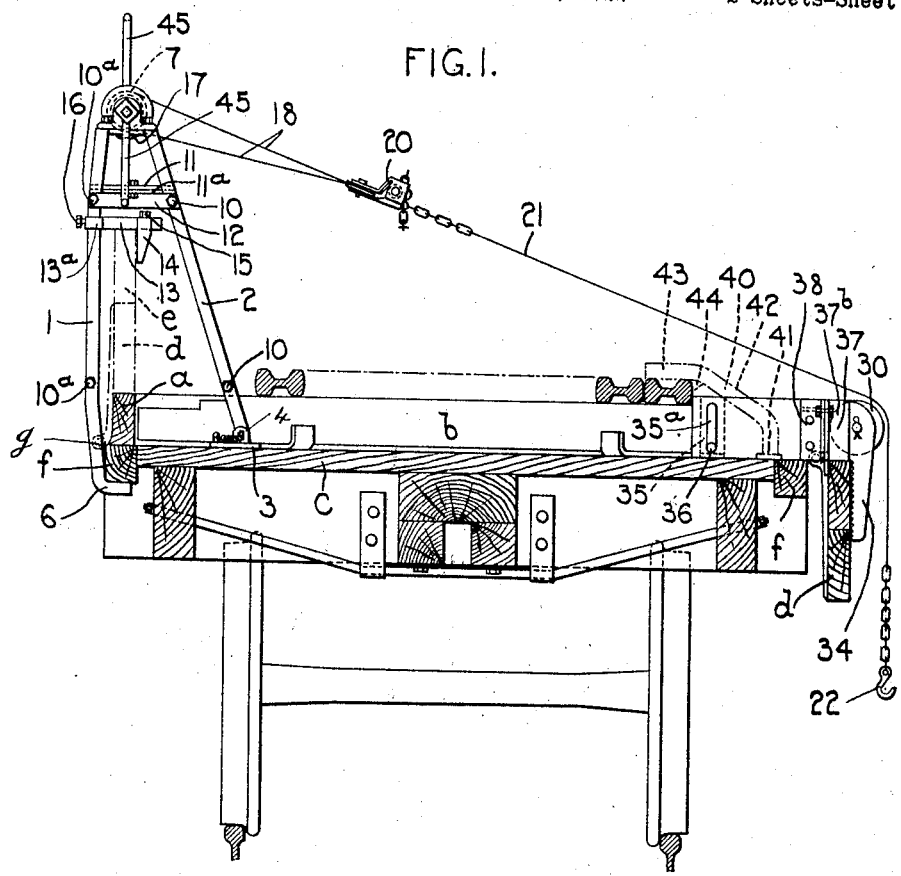
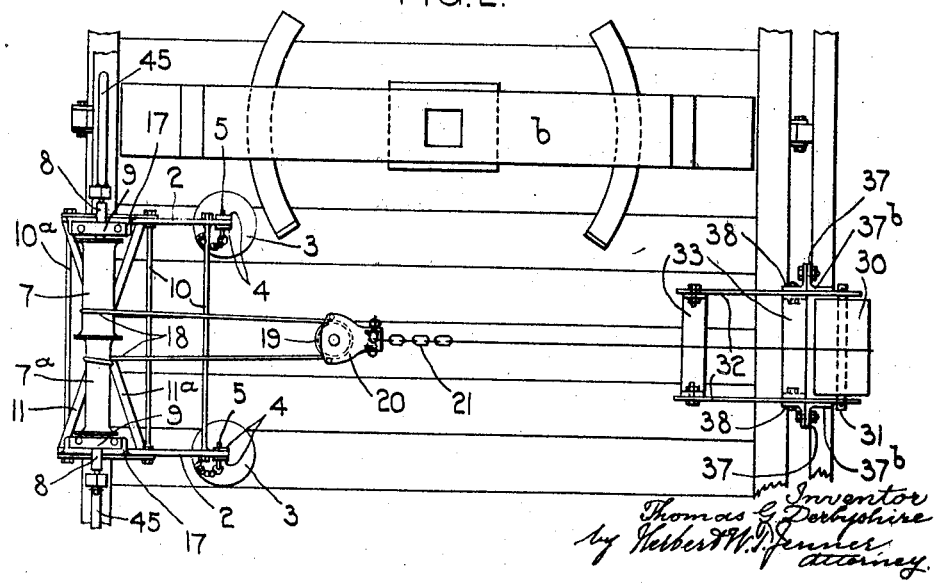

March 31. 1925.
T. G. DERBYSHIRE
1,532,047
LIFTING AND HAULING APPLIANCE
Filed Dec. 20, 1922    2 Sheets-Sheet 2
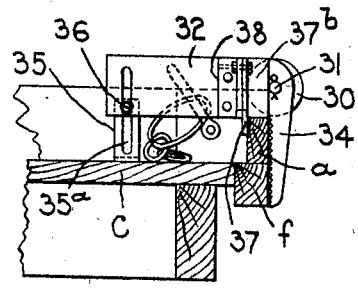
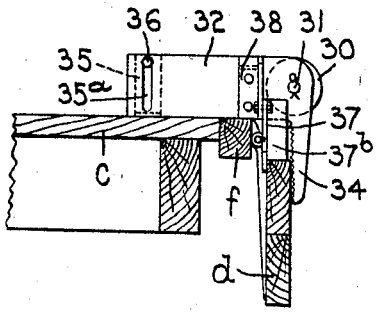
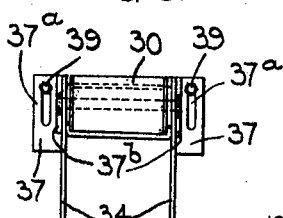
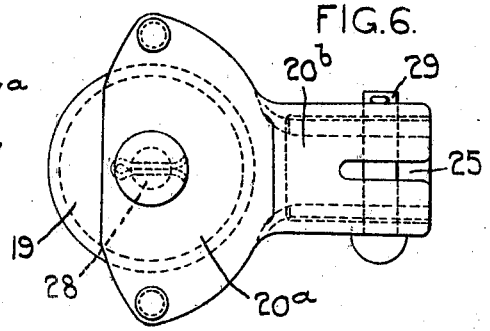
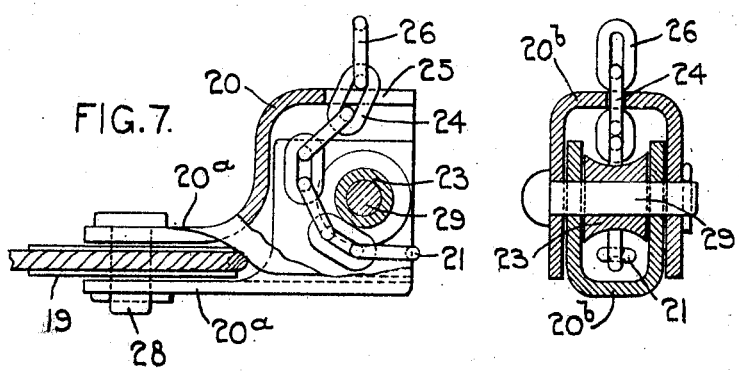
Inventor
Thomas G. Derbyshire
by Herbert W. T. Jenner
Attorney Patented Mar. 31, 1925.

1,532,047

UNITED STATES PATENT OFFICE.

THOMAS GEORGE DERBYSHIRE, OF PALMER'S GREEN, LONDON, ENGLAND.

LIFTING AND HAULING APPLIANCE.

Application filed December 20, 1922. Serial No. 608,041.

*To all whom it may concern:*

Be it known that I, THOMAS GEORGE DERBYSHIRE, a subject of the King of Great Britain, residing at Palmer's Green, London, N. 13, England (whose post-office address is 10 Belsize Avenue, Palmer's Green, London, N. 13, England), have invented certain new and useful Improvements in and Relating to Lifting and Hauling Appliances; and I do hereby declare the following to be a full, clear, and exact description of the invention, such as will enable others skilled in the art to which it appertains to make and use the same.

Heretofore for loading railway track rails (for instance worn rails removed from traffic tracks or road and laid on the permanent way between such roads) on to trucks it has been customary to employ a gang of men, numbering from twenty to thirty according to the weight and length of the rails, who lift the rail bodily from the permanent way and throw it on to the truck or trucks, there being usually two or three (according to the length of the rails) of such trucks standing end to end. Each rail thus loaded on to the trucks must then be shifted manually from the side of the trucks at which the loading is effected to or adjacent to the opposite side of the truck so that the rails are closely packed side by side on the floor, or on the transverse baulks or bolsters usually provided on the floor, of the trucks.

This method of loading rails is objectionable not only on account of the cost of labour required, but also because of the comparatively long time taken in the loading and the liability of accidents resulting in injury to the men engaged in handling the rails.

The present invention has for its principal object to provide a simple and effective method of and apparatus for loading track rails, or other heavy articles, on to trucks or wagons in an easy, safe and expeditious manner, and without the necessity of employing the comparatively large number of men heretofore required.

While the present invention relates to lifting and hauling appliances or apparatus more particularly intended to be used for loading railway track rails on to trucks or wagons, the invention is, however, not limited in its application to railway trucks or wagons, nor is it limited to use for loading track rails on to such trucks or wagons, as the apparatus might be employed for loading iron or steel girders, baulks or logs of timber, and other lengthy or heavy articles or structures on to railway or other trucks or wagons.

The invention consists principally in a lifting or hauling appliance or lifting and hauling apparatus comprising a suitable frame or support mounted, or adapted to be mounted, on a railway or other truck or wagon at or adjacent to the side or side wall (or it might be the end or end wall) of the truck or wagon remote from the side or end of the truck or wagon adjacent to which the rails, girders or other articles to be loaded on to the truck are located. Preferably the said lifting or hauling apparatus is so mounted on the truck or wagon that it can be easily and quickly removed when not required for use.

Further according to this invention, in one embodiment thereof, the lifting and hauling apparatus comprises a winch roller mounted in a frame having a leg or a pair of legs the lower end or ends of which is or are adapted to stand or rest on the floor of the truck or wagon and another leg or pair of legs arranged to extend outside the truck, the latter leg or legs having a laterally projecting part or a hooked end adapted to engage under the sole bar or frame of the truck to prevent the leg or legs, and consequently the apparatus as a whole, from lifting when the load is put upon the apparatus, the construction and arrangements being such that the apparatus is retained in proper position on the wagon without the employment of any fastening devices for securing the apparatus to the truck. The leg which extends outside the side or wall of the truck has attached to it a transversely arranged member or bar which can be adjusted to various heights and which bridges the side or wall of the truck and constitutes a bracket or bearing member which rests on the upper edge or top of the side (or it may be on the floor) of the truck and supports the leg or legs extending outside and engaging beneath the truck frame or other suitable part of or on the wagon structure.

Further in the preferred embodiment of the invention the winch roller comprises parts of different diameters on which a rope or chain is arranged so that when a part thereof lapped on to the part of the roller of larger diameter is hauled in, another part which is lapped on the part of smaller diameter is paid out, and vice versa. The bight or loop of the said rope or chain is passed around the pulley wheel of a sheave or pulley block comprising a plate or frame having a slot therein into which can be passed the links of one end of a lifting chain the other end of which is furnished with means, for instance a hook, whereby the chain is adapted to be engaged with the rail or other article to be lifted, the said slot or a portion thereof being narrow so that one link of the chain can be lodged therein edgewise while the next link by reason of its lying transversely to the slot is supported by the plate or frame and takes the weight of the load on the chain, guiding means, preferably a pulley wheel, for the chain being carried in the said frame.

Further according to this invention a guard roller is provided for use with the lifting and hauling apparatus or winch, the said roller being mounted in a frame which in use rests on the floor of the truck on the side or end thereof opposite to that at or adjacent to which the winch or lifting and hauling apparatus is mounted the said frame having a part extending downwardly outside of the truck or of the edge of the floor thereof. The roller frame is conveniently made higher than the baulks or bolsters usually provided on the floor of the truck for the rails to rest on when loaded on the truck.

The invention further consists in the lifting and hauling apparatus or appliances substantially as hereinafter described with reference to the accompanying drawings, in which,—

Fig. 1 is a transverse sectional view of a railway truck and shows lifting and hauling apparatus according to the preferred embodiment of the invention.

Fig. 2 is a plan of a portion of the truck shown in Fig. 1 and of the lifting and hauling apparatus mounted on the truck.

Figs. 3 and 4 are views of side portions of a truck, taken transversely of the truck, and show details of the guard roller hereinafter fully described.

Fig. 5 is a front view of the guard roller.

Figs. 6, 7 and 8 are respectively a plan, a side elevation partly in section and a transverse section of the sheave or pulley block hereinafter fully described.

Like reference numbers indicate like parts in the several figures of the drawings.

Fig. 1 illustrates three known types of railway truck or wagon, namely, one having low fixed sides $a$ and transverse bolsters $b$ mounted on the floor $c$ (this type of wagon being also illustrated in Fig. 3), another with higher hinged sides $d$, indicated at the left of Fig. 1 by the dot and dash lines immediately above $a$, and the third with still higher hinged sides $e$ indicated at the left of Fig. 1 by the dot and dash lines immediately above $d$. $f$ are the sole bars of the truck or wagon the underframe of which may be of any known or suitable construction. $g$ indicates the usual hinges of the hinged sides $d$ and $e$.

In the embodiment of the invention illustrated in the drawings referring to Fig. 1, 1 and 2 are the hereinbefore mentioned legs or supports which as shown straddle the side or side wall $a$, $d$ or $e$ of the truck according to the type of truck or wagon to which the lifting and hauling apparatus according to this invention is applied, the lower ends of the legs 2 in the example shewn, being fitted with flat plates or discs 3 of suitable dimensions which constitute feet which rest upon the floor $c$ of the truck, the said plates or discs 3 being preferably, as in the example illustrated, attached to the lower ends of the legs 2 in an easily movable manner for instance by means of the lugs 4 on the upper sides of the feet 3 taking on either side of the lower ends of the legs 2 and secured thereto by split pins 5 passing through coinciding holes in the lugs 4 and in the lower ends of the legs 2. 6 is the hereinbefore mentioned laterally projecting part of or on (as shown formed integrally with) the lower end of each leg 1 these lateral projections 6 being adapted to engage the underside of the sole bar $f$ as clearly shown in Fig. 1. 7 is the hereinbefore mentioned winch roller, the spindle 8, see Fig. 2, of which is mounted to rotate in brackets or bearings 9 secured to the upper ends of the legs 1 and 2 the said winch roller preferably having larger and smaller diameter portions the latter of which is indicated the reference number 7a in Fig. 2. 10 (see Fig. 2) are transverse tie rods or bars extending between and bracing together the legs 2, and 10a are similar tie rods or bars bracing the legs 1 together. 11 and 11a are diagonally arranged tie rods or bars the opposite ends of which are secured respectively to the legs 1 and 2, in the example shown by the adjacent tie rods 10 and 10a, the ends of the tie bars 11 and 11a being suitably bent to lie against the inner sides of the legs 1 and 2. These diagonally arranged tie bars 11 and 11a in the example shown are secured to the legs near the upper ends thereof as indicated in Fig. 1. The tie rods 10 and 10ª and tie bars 11 and 11ª serve to rigidly connect together the supporting frame for the winch roller 7 constituted by the legs 1 and 2. 12 are bars forming struts connecting together the legs 1 and 2 these bars or struts 12 as shown lying transversely to the side or wall of the wagon and being secured to the legs 1 and 2 by means of the adjacent tie rods 10 and 10ª. 13, Fig. 1, is the transverse arm capable of up and down sliding movement on the leg 1, there being one of these arms on each leg 1; in the example shown the arm 13 is provided with a slotted end or socket 13ª which embraces the leg 1 and there is also fitted upon the arm 13 a downwardly projecting arm 14 capable of sliding movement along the arm 13. In the example illustrated the upper end of the downwardly projecting arm 14 would be slotted to receive the arm 13 and a set screw 15 is provided for holding the arm 14 in the desired position on arm 13. Similarly a set screw 16 may be provided in the outer end of arm 13 to hold it in the desired position on the leg 1. As shown in Fig. 1 the arm 14 projects downwardly on the inner side of the side wall of the truck or wagon and the arm 13 rests upon the upper edge of the side wall of the truck or wagon the arms 13 and 14 thus serving as means for steadying and retaining the winch or hauling apparatus in proper position when in use.

Each pair of legs 1 and 2 may conveniently be made of a single length of wrought iron bar rectangular in cross section and of suitable dimensions, this bar being suitably bent to form the legs 1 and 2 with hooked end or lateral projection 6 on leg 1, that part of the bar which when bent to shape forms the bridge or connecting portion between the upper ends of the legs 1 and 2 being bent so that it lies at right angles to the remaining portion of the bar (i. e., the portion constituting the legs 1 and 2) and thus forms a support 17 at the upper ends of the legs 1 and 2 on which the bearings 9 on the winch roller are mounted. These bearings 9 may be secured to the said supports 17 by bolts and nuts.

18 indicates a rope, preferably a wire rope, one end of which is secured in the usual or any suitable manner to the larger diameter portion 7 of the winch roller and the other end similarly secured to the smaller diameter portion 7ª of the said roller, the loop or bight of the rope 18 passing around the pulley wheel 19 carried by the sheave or pulley block 20 hereinafter more fully described; and 21 is the hereinbefore mentioned lifting chain one end of which is held in the sheave 20 and on the other end of which the hook 22 (Fig. 1) is provided. In the sheave or pulley block 20 there is mounted a roller or pulley wheel 23 (Figs. 7 and 8) around which the adjacent end of the chain 21 is guided the said chain being securely held in that part of the sheave 20 which forms the housing for the pulley or guide wheel 23 by reason of the link 24 (Figs. 7 and 8) being engaged in the slot 25 (Figs. 6 and 7) in the upper part of the sheave 20 and the link 26 lying transversely of the said slot and bearing upon the top of that part of the sheave which forms the housing for the guide wheel or pulley 23. As shown in Figs. 6, 7 and 8 the sheave 20 consists of upper and lower plates suitably secured together and formed and arranged so as to provide a housing or bearing for the pulley wheel 19 as well as the hereinbefore mentioned housing for the guide wheel or pulley 23; 27 being the spindle on which the pulley wheel 19 rotates and 28 the pin or spindle on which the guide wheel 23 is rotatable. As shown in Figs. 7 and 8 the sheave 20 constituting the bearings or housings for the pulley wheel 19 and guide wheel or pulley 23 is formed of upper and lower plates preferably of wrought iron the portions 20ª of these plates constituting the housing for the pulley wheel 19 being suitably spaced apart and lying parallel or substantially parallel with each other while the portions 20ᵇ of the said plates are bent to a U-form as shown in Fig. 8 the U-shaped portion of the lower plate lying within the inverted U-shaped portion of the upper plate these U-shaped portions constituting the housing for the guide wheel or pulleys 23 and for that portion of the lifting chain 21 which is led into and retained in the said housing.

30 is the hereinbefore mentioned guard roller mounted at the side of the truck or wagon remote from that end at which the winch roller 7 and its supporting frame are mounted the said guard roller being rotatably mounted on a spindle 31 carried in the outer ends of the side members 32 of the frame in which the guard roller is mounted, the said side members being rigidly held together by means of the transverse struts or bars 33 which, in the example shown, have upturned ends by means of which they are secured to side members 32 (Fig. 2) by bolts and nuts as shown; 34, (Figs. 1, 3, 4 and 5) are downwardly projecting parts or arms on, preferably formed integrally with, the side members 32 of the guard roller frame, the said arms 34 being adapted to extend downwardly outside the truck or wagon and to bear or lie with their inner edges against the outside of the wagon; as shown in Figs. 1 and 4 these arms 34 lie against the dropped down side *d* of the truck or wagon, while in Fig. 3 the said arms 34 of the guard roller frame lie or bear against the sole bar and outer side of the side wall *a* of the truck or wagon. As shewn in Figs. 1 and 4 the supporting frame of the guard roller, constituted by the side members 32 and the cross members or struts 33, rests upon the floor $c$ and sole bar $f$ of the truck or wagon, while in Fig. 3 the said frame rests at its outer end on the upper edge of the side or side wall of the truck while its inner end is supported by adjustable supports or feet 35 carried by the side members 32; this adjustable support may conveniently consist of the hereinbefore mentioned strut or cross bar 33 near the inner end of the side members 32 having slots 35ª of suitable length formed in its upstanding ends, corresponding slots being if desired also formed in the side members 32, and the said adjustable support 35 can be retained in the desired position by means of the bolts and nuts 36 (Figs. 3 and 4).

In order to provide for effectively supporting the outer end of the guard roller frame in the case of wagons with hinged or drop down sides which are hinged to the wagon at a point below the level of the floor as illustrated in Fig. 7, adjustable supporting members 37 (Figs. 4 and 5) are mounted on the side members 32 of the guard roller frame adjacent the outer end thereof; in the example shewn the supporting members 37 consist of pieces of angle iron in which slots 37ª are formed these pieces of angle iron being adjustably secured to other pieces of angle iron 38 (see Figs. 1, 2, 3 and 4) riveted or otherwise suitably secured to the side members 32 of the guard roller frame; as shewn the slots 37ª are provided in the laterally projecting portions of the angle iron 37 and corresponding slots may be also provided in the laterally projecting portions of the angle iron 38, which latter portions lie immediately behind the lateral portions of the angle iron 37 which, in the example shown, are adjustably secured to the angle iron 38 by means of bolts 39 the constructions and arrangements being such that the angle iron 37 can be moved up or down according to whether the guard roller and its frame is mounted on a wagon having a drop down side or wall hinged at the position shewn in Fig. 1 or on a truck or wagon having a drop down side or wall hinged at a lower position as shewn in Fig. 4. As illustrated in Fig. 4 the angle iron or supporting members 37 are in the lowered position with the lower edges of the forwardly projecting parts or webs 37ᵇ resting on the upper edge of the dropped down side of the truck, while in Fig. 1 the said supporting members or angle irons 37 are in the raised position so that the lower edges of their forwardly projecting parts or webs 37ᵇ which rest upon the upper edge of the dropped down side $d$ of the truck are on a level with the floor of the truck.

As shewn the laterally projecting parts of the supporting members or angle irons 37 are longer than the forwardly projecting parts 37ᵇ thereof the lower portions of these laterally projecting parts taking behind the upper edge of the dropped down side $d$ of the truck or, in the case of Fig. 3, on the inner side of the side or wall $a$ of the truck. When applied to a truck of the type illustrated in Fig. 3, i. e., having the low fixed side $a$, it will be seen that the guard roller frame 32 rests at its outer end on the upper edge of the side $a$ of the truck while at its inner end it is supported on the floor of the truck by the supporting member or feet 35 being suitably adjusted relatively to the side members 32 and held in the required position by the bolts 36 as hereinbefore mentioned.

40 (Fig. 1) indicates a ramp or guide member adapted to be employed as and for the purpose hereinafter mentioned. As shewn the guide member or ramp 40, which may be made of wrought iron, comprises a foot 41 adapted to rest on the floor $c$ or on the sole bar $f$ of the truck, an upwardly sloping portion 42 and a horizontal portion 43 adapted to rest upon a rail of the first row or layer of rails which have been loaded directly on to the bolsters $b$ of the trucks; 44 is a downward projection on the ramp or guide member 40 said projection being adapted to bear or abut against the adjacent rail lying on the bolster $b$. 45 (Figs. 1 and 2) are the operating handles of the winch roller 7 these handles being suitably secured to squared portions of the ends of the spindle 8 of the winch roller which latter may be of any suitable construction.

As shown in Fig. 1 the lifting chain 21 is guided over and works upon the guard roller 30.

As already mentioned, for loading rails from the permanent way on to trucks usually two and sometimes three trucks (depending upon the length of the rails to be dealt with) standing end to end are employed. Assuming two trucks to be employed one set of lifting and hauling apparatus comprising the winch roller and its supporting frame or legs 1 and 2 as hereinbefore described and one guard roller 30 comprising its supporting frame 32, 33 and its associated parts would be mounted on each truck preferably midway between the ends of the truck, and one or two men standing upon each truck would operate the winch roller 7 by means of its operating handles 45, and, the hooked ends 22 of the lifting chain 21 on each truck having been engaged with or secured around the length of rail by a man or men on the permanent way the men on the trucks by turning the winch handles 45 and winding the wire rope 18 up on the larger diameter portion 7 of the winch roller will, through the medium of the lifting chain 21, lift and haul the rail up over the guard roller 30 on each wagon and on to the usual bolsters or supports b on the floor of the wagon the first rail thus loaded on to the wagon being drawn across the truck from the loading side at which the guard roller 30 is mounted towards the opposite side of the truck at which the hauling and lifting apparatus is mounted, each succeeding rail being similarly loaded on to the truck. When the desired number of rails have been thus loaded on to the trucks and laid side by side on the bolsters b as indicated in Fig. 1, if further rails are to be loaded on to the trucks, so as to form a second layer of rails lying on the first layer, the hereinbefore mentioned guide members or ramps 40 are placed in the position shewn in Fig. 1 so that the rails to be loaded on to the top of those already lying on the bolsters b will be guided up on the ramps or guide members 40.

With the method and apparatus of loading rails, such as worn rails removed from traffic roads and laid in the 6 ft. way on to railway trucks the loading can be effected expeditiously and safely with the employment of a minimum number of men it being at most necessary to employ only two men on each truck to operate the lifting and hauling apparatus and two men on the permanent way for securing the hooked ends of the lifting chains 21 to the rail length to be loaded and if necessary to assist in guiding or steadying the rail during the lifting operation.

It will be seen that with the apparatus as above described neither the lifting and hauling apparatus comprising the winch roller 7 and its supporting frame nor the guard roller 30 and its supporting frame are in any way fastened to or secured to the truck or wagon, the legs 2 of the winch frame simply resting upon the floor c of the truck or wagon while the legs 1 simply engage, by their lateral projections or hooked ends 6, under a portion of the wagon structure as shown the sole bar 6. The apparatus is therefore readily removable from one wagon to another and is easily portable from place to place, and is further such that it can be conveyed in a guard's van to any portion of a railway line where it is desired to load rails or other heavy articles on to trucks or wagons.

The guard roller 30 with its frame is also simply placed upon the truck or wagon there being no fastening device securing it to the wagon structure, the downwardly projecting parts or arms 34 on the side members 32 of the guard roller frame serving to prevent displacement inwardly and tilting of the guard roller and its frame when under pressure of the load on the lifting chain 21.

By means of the housing in the sheave 20 in which the links of the lifting chain 21 lie (see Figs. 7 and 8) and the slotted part of this housing engaged by the links 24 and 26 of the lifting chain as hereinbefore described provision is made for easily and quickly taking up any slack there may be in the lifting chain 21 when its hooked end has been engaged with or fastened to the rail or other article or structure to be lifted, it being only necessary to slip the link 24 out of the slot 25, pull up the slack of the chain by hand and insert another link of the chain edgewise in the slot 25 with the adjacent link placed transversely of the slot as in the case of the links 24 and 26 (Figs. 7 and 8).

It is to be understood that the present invention is not limited to the precise arrangements and constructional details of the parts of the apparatus as hereinbefore described with reference to the accompanying drawings, as modifications might be made without departing from the main features of the invention.

What I claim as my invention and desire to secure by Letters Patent is:—

1. In loading devices for cars, a frame provided with an upright or leg adapted to be stood loosely on the platform of a car and having means which engage with the car body and prevent the frame from sliding on the car platform towards the load, and a winding barrel journaled at the top of the said frame.

2. In loading devices for cars, a frame provided with legs adapted to straddle one side portion of the car, the inner legs being provided with plates adapted to be stood loosely on the car, and the outer legs having means which engage with the car body and prevent the frame from sliding horizontally towards the load, and a winding barrel journaled at the top of the said frame.

3. In loading devices for cars, a frame provided with legs adapted to straddle one side portion of the car, the inner legs being provided with plates adapted to be stood loosely on the car, and the outer legs having lateral projections for engaging with the car body, adjustable arms mounted on the outer legs and adapted to engage with the upper part of the said side portion of the car, and a winding barrel journaled at the top of the said frame.

4. In loading devices for cars, the combination with a frame and a winding barrel as set forth in claim 1, of a lifting device wound on the barrel, and a revoluble guard roller for said lifting device mounted in a frame adapted to be stood loosely on the car, and provided with means which prevent it from sliding horizontally towards the winding barrel.

5. In loading devices for cars, the combination with a frame and a winding barrel as set forth in claim 1, of a lifting device wound on the barrel, a revoluble guard roller for the lifting device mounted in a frame, an adjustable support for the inner end of the guard roller frame adapted to be stood loosely on the car, and means for preventing the guard roller frame from sliding horizontally towards the winding barrel, said means being secured to the outer end of the guard roller frame and adapted to engage with the car body.

In testimony whereof I affix my signature.

THOMAS GEORGE DERBYSHIRE.